(12) United States Patent
Giacomini

(10) Patent No.: US 6,196,262 B1
(45) Date of Patent: Mar. 6, 2001

(54) VALVE FOR TESTING AND DRAINING SPRINKLER SYSTEMS

(75) Inventor: Mario Giacomini, Novara (IT)

(73) Assignee: Giacomini S.p.A., Novara (IT)

( * ) Notice: Subject to any disclaimer, the term of this patent is extended or adjusted under 35 U.S.C. 154(b) by 0 days.

(21) Appl. No.: 09/343,261

(22) Filed: Jun. 30, 1999

(30) Foreign Application Priority Data

Jan. 11, 1999 (IT) .............................................. CO99A0004

(51) Int. Cl.[7] ........................... F16K 37/00; G01M 19/00
(52) U.S. Cl. ........................... 137/559; 251/118; 73/168
(58) Field of Search ........................... 137/559; 251/118, 251/126, 127, 208; 73/168

(56) References Cited

U.S. PATENT DOCUMENTS

| | | | |
|---|---|---|---|
| 4,655,078 | * | 4/1987 | Johnson .............................. 137/559 X |
| 4,729,403 | * | 3/1988 | Roche .................................. 137/559 |
| 4,741,361 | * | 5/1988 | McHugh .............................. 137/559 |
| 5,533,549 | * | 7/1996 | Sherman .......................... 251/118 X |

\* cited by examiner

*Primary Examiner*—Kevin Lee
(74) *Attorney, Agent, or Firm*—Young & Thompson

(57) ABSTRACT

Valve for testing and draining sprinkler systems comprises a half-body with an inlet channel and a half-body with an outlet channel which define a housing chamber which houses the valve shutter and is in continuous fluid communication with the inlet channel. The ball shutter has a through channel with end openings having a different diameter as well as a third opening of a joining channel the axis of which is at right angle to the through channel and the joining channel opens out into the latter. Within the outlet channel the shutter is supported by an annular gasket whereas at the inlet side the shutter is supported by a springing insert which has apertures and causes turbulences in the flowing flow.

8 Claims, 10 Drawing Sheets

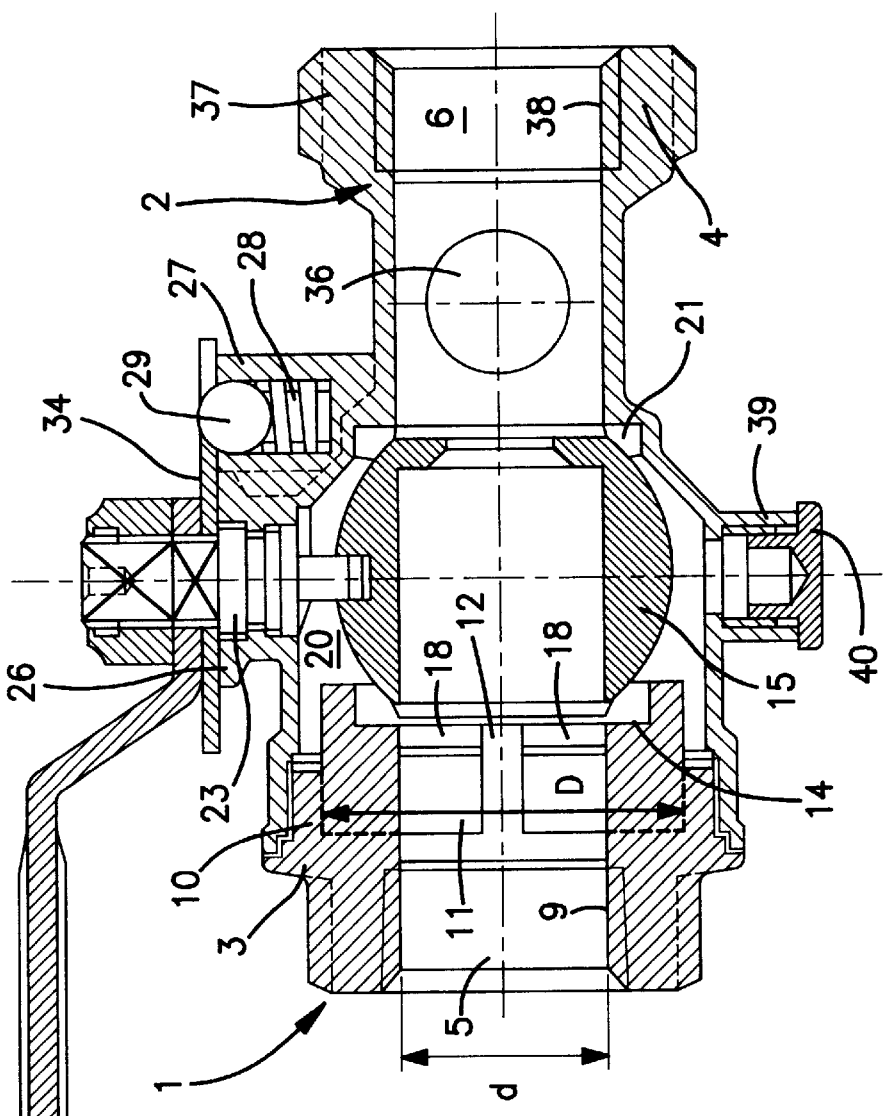
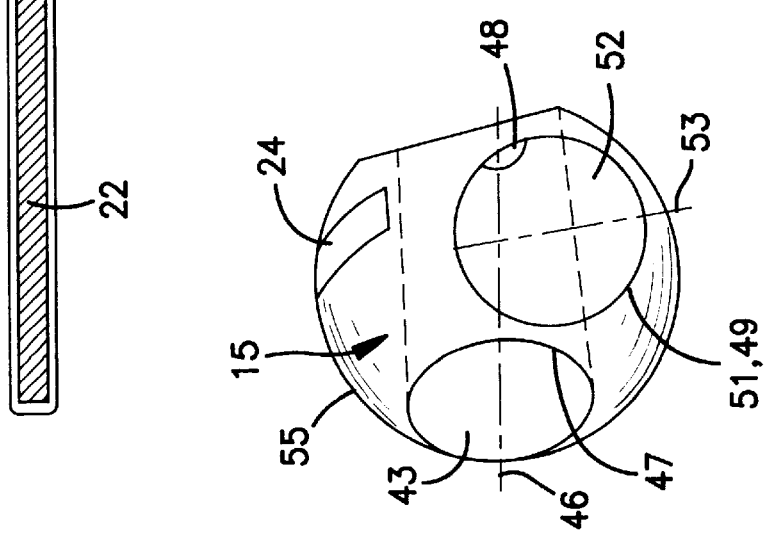
FIG. 1
FIG. 2

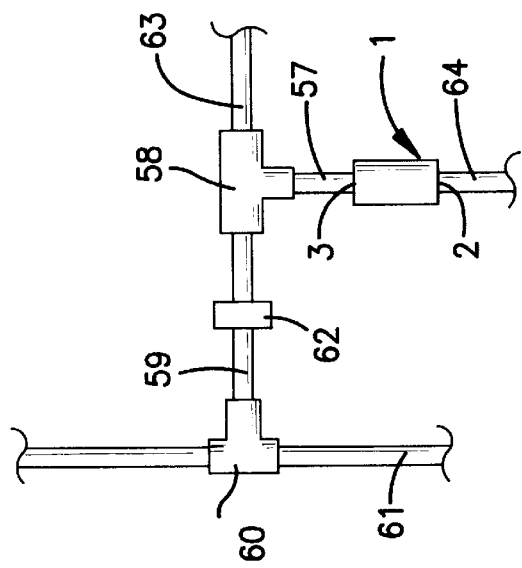
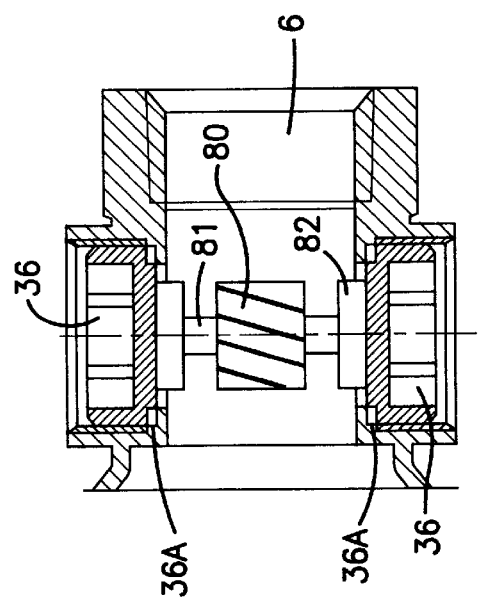
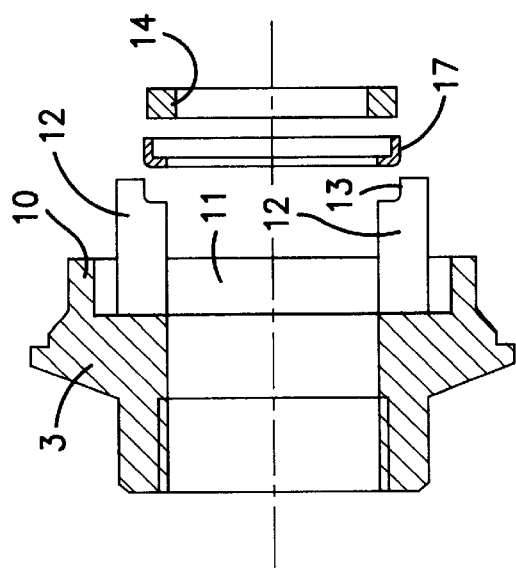
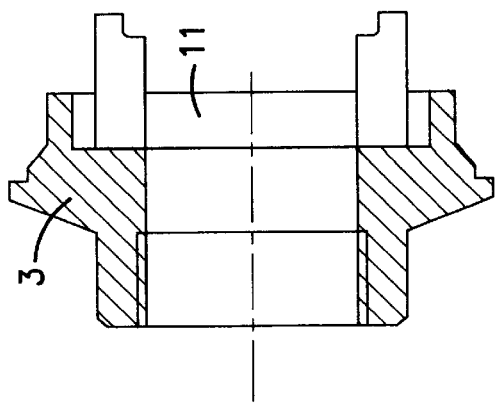

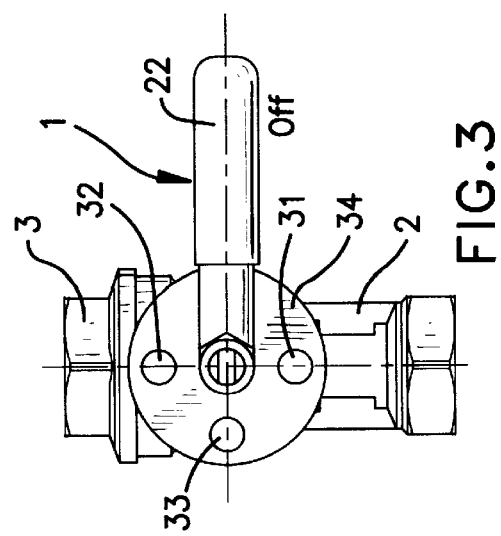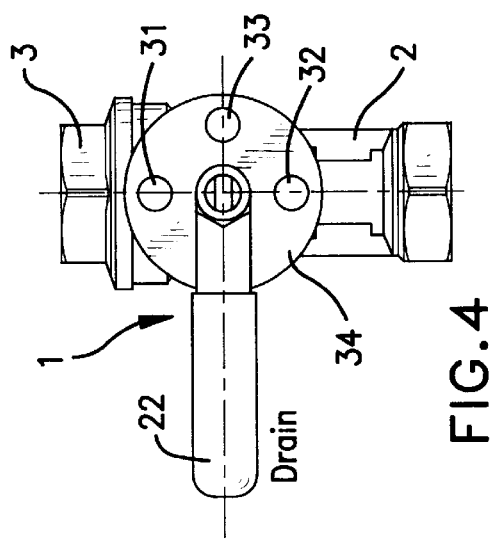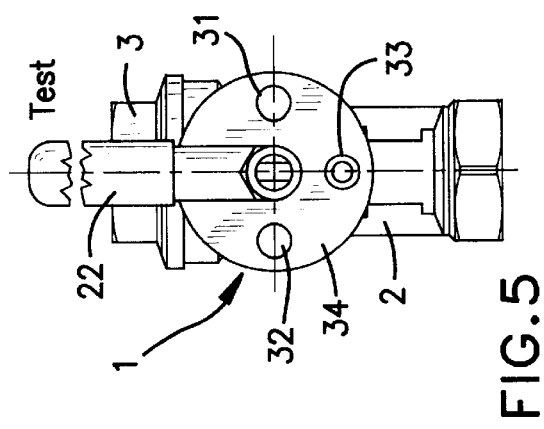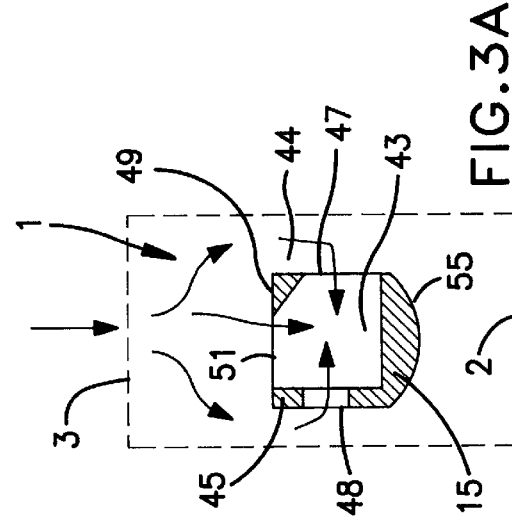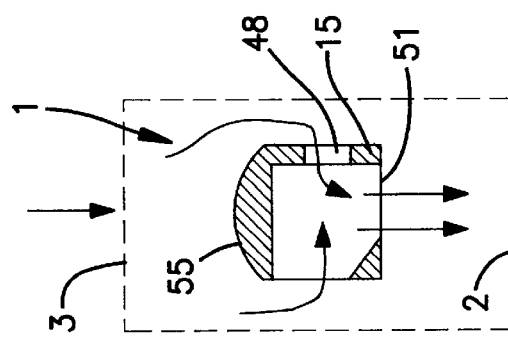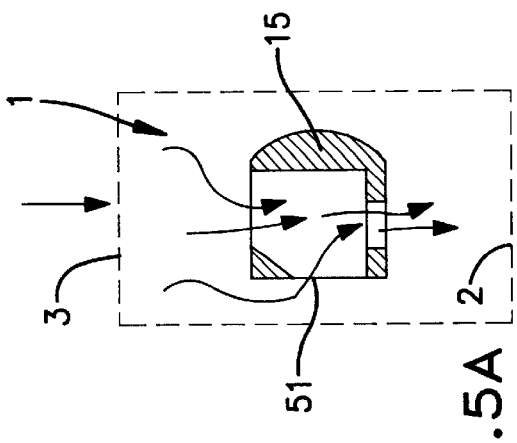

VALVE FOR TESTING AND DRAINING SPRINKLER SYSTEMS

FIELD OF THE INVENTION

The present invention relates to an improved valve for testing and draining sprinkler systems.

BACKGROUND OF THE INVENTION

In sprinkler systems in buildings as, for example, in multi-floor buildings, garages, skyscrapers and so on, it is known to branch from a water supplying riser at each building floor a floor branch conduit in which, upstream of the respective water distribution net comprising the sprinkler heads are to be typically provided a drain valve for draining said sprinkler net, a test valve, a fitting provided with observation windows for detecting the flowing water flow, and an electrical alarm device, as required for example by the United States Fire Suppression Specifications.

The purpose of said arrangement is from time to time to test the operability of the signal or alarm circuit (the signal of which may be a local audible signal and/or an alarm signal transmitted to the nearest Firemen Station) in case of real or simulated (by means of the arrangement test function) water delivering by at least one sprinkler head as well as to allow, after having previously closed the upstream main valve or general control valve, a draining of the sprinkler system, for example for maintenance purposes or replacing one or more of the sprinkler heads.

The valve devices have been recently joined to form an integrated multi-valve units which are able to carry out both the test and drain functions and incorporate said observation windows for detecting the water flow, as disclosed for example in the U.S. Pat. No. 4,655,078 to Augustus W. Johnson and U.S. Pat. No. 4,643,224 to Robert Rung et al.

A similar valve incorporating an observation window is also disclosed in the U.S. Pat. No. 4,741,361 to George J. McHugh.

The valve disclosed in U.S. Pat. No. 4,655,078 comprises a conventional ball shutter, that is a shutter having a through channel the inlet and outlet openings of which are defined by two opposite ball flattenings and have a diameter similar to the diameter of the valve inlet and outlet channels. In said shutter is provided a second hole which extends diametrically and is coplanar with respect to said through channel, encloses a certain angle with the latter and has a small diameter which substantially corresponds to the internal diameter of the inlet channel of each sprinkler head. The shutter is supported in a conventional way between two opposite gaskets placed in correspondent seats provided in a closed chamber housing the shutter.

The ball shutter according to the U.S. Pat. No. '078 differs therefore from the known ball shutters because it presents said second through channel and therefore, the ball shutter can be rotated around the vertical axis thereof in three positions, and more exactly in both the conventional valve closing and opening positions by use of the known through channel with a bigger hole (here used for the draining function), with the additional possibility to open the valve by using the through channel having the smaller diameter (testing function). Two diametrically opposite observation windows are housed within the valve outlet channel.

As in the conventional ball valves also in the valve according to the U.S. Pat. No '078 the water flow is intercepted at the inlet side. The valve disclosed in the U.S. Pat. No. '078 is of a linear type indeed, that is with coaxial inlet and outlet channels, which allows quicker working and assembling steps and smaller overall dimensions as well as a smaller material expenditure with respect to valves having a L-shaped or a T-shaped valve body. In reality, the smaller material expenditure achievable with the valve disclosed in U.S. Pat. No. '078 is negligible as, with respect to the conventional ball valves, the proposed shutters have a bigger diameter due to the requirement of working a second through channel in a coplanar and angularly offset position with respect to the conventional through channel. A further disadvantage due to the presence of both through channels in the ball shutter is to be seen in the dimensional limits of such ball shutter, so that the teaching of Johnson can be surely carried out with medium or large ball shutters, for example with shutters having a diameter of 2-½" as stated in Johnson's patent.

However, said teaching can not be carried out with shutters having a smaller diameter, for example of 1" or ¾", as frequently desirable indeed.

Another drawback of the valves according to U.S. Pat. No. '078 is to be seen in the fact that both rectilinear through channels have a uniform diameter, so that the outlet liquid flow is practically uniform and regular, that is the liquid flow is practically without any turbulence, so that it is rather difficult to visually detect the flowing liquid by observing through the observation windows.

It is further stressed that the ball shutter seal is achieved by means of a strong pressure onto the shutter clamped between two opposite supporting gaskets, which, together with the fact that the ball in closing position (which is typically adopted in sprinkler systems) within the inlet channel is exposed to the water pressure, whereas in the outlet channel practically exists an atmospheric pressure, causes that the control couples, that is the opening couples, require a rather intensive manual effort.

It is further stressed the fact that sandy matter that may be wedged between the gaskets and the shutter is in fact captured therebetween so that by rotating the shutter gasket wearings may occur, which jeopardize the valve seal.

The U.S. Pat. No. 4,643,224 discloses a double valve with two opposite valve chambers which are in fluid communication with the inlet channel and singularly house one of two shutters with associated outer control hand-wheel. Both outlet channels of said chambers join in a common outlet channel. One valve is provided for the testing function whereas the other one is provided for the draining function. Within the outlet channel of the testing chamber is housed a flow detecting device in the form of a transparent cylinder housed in the valve body and provided with a small delivering hole which opens out in a bigger chamber in which, due to the different pressures upstream and downstream of said delivering hole, cavitations are formed which facilitate the visual detection of the flowing flow. Also the valve disclosed in the U.S. Pat. No. '224 is of a linear type. However, in such valve the construction of two distinct opposite valves and the observation cylinder, as well as the necessary large room which is necessary for an easy access to both control hand-wheels are rather costly. Another drawback resides in the fact that the valve body is to be produced by casting and will therefore be affected by the typical disadvantages of castings like porosity, cavities and cracks in the structure, rather thick walls for overcoming above discussed drawbacks, as well as asymmetric working for housing both shutters and said observation cylinder.

The U.S. Pat. No. 4,741,361 discloses a valve with a T-shaped configuration in which the axes of the inlet and outlet channels are at 90° to one another, and the third opening is not operable and is closed by a plug. Also by eliminating said opening closed by the plug the valve would present in any case a L-shaped configuration, that is with inlet and outlet channels at an angle of 90°. This configuration requires on the one hand a greater installation room with respect to rectilinear valves, that is valves with coaxial inlet and outlet channels. Differently from the conventional ball shutters, the shutter disclosed in the U.S. Pat. No. '361 has the conventional through channel having, diametrically opposite, the conventional opening and an opening with a smaller diameter. At right angle to said through channel is provided a third opening which opens out in said through channel and has a diameter similar to that of said through channel. Both openings with the large diameter are defined by opposite flattenings.

In this shutter are cleverly provided two diametrically opposite slots for housing the profiled end of the control stem, so that the proposed valve can be configured for left-handed or right-handed operation. Also in the U.S. Pat. No. '361 the ball shutter is supported between two opposite annular gaskets housed in the valve body. Therefore, the chamber housing the ball shutter, like the valve disclosed in the U.S. Pat. No. '078, forms a closed chamber without any operable function. Also for the valve proposed in the U.S. Pat. No. '361 is required a strong opening couple.

Further, a valve manufactured by the applicant is known with a rectilinear valve body in two parts and a multi-opening ball shutter supported between two opposite gaskets in an open chamber which is in fluid communication with the inlet chamber through a cage-like configuration of a valve half-body forming the inlet channel. In said cage-like half-body is supported the shutter gasket at the inlet side. In the ball shutter is provided a third flattening defining the small opening of the through channel. Also said valve is affected by said two drawbacks due on the one end to the possible wearings of the annular gasket supporting the shutter, and on the other hand to the necessary strong opening couple. The three necessary positions are snaply defined by a removable engagement between a ball springingly housed within the valve body and the apertures provided at 90° to one another on a common circle in a rotatable plate which can be rotated together with the shutter control lever provided with stop tongues cooperating with a projection of the valve body in order to delimit therewith a 180° rotation of the control lever, that is of the ball shutter.

SUMMARY OF THE INVENTION

It is therefore an object of the present invention to provide an improved valve for testing and draining sprinkler systems which is not affected by the drawbacks of the prior art valves.

A further object is to provide a valve design with a rectilinear valve body with small dimensions and with improvements which allow to considerably reduce the valve opening couple even after a long time lasting of the shutter in the closing position.

Still another object of the present invention is to avoid possible wearings in the ball shutter supporting system in order to guarantee an exceptionable valve seal.

Another object of the invention is to achieve an efficient self-cleaning action between the ball shutter and the respective supporting system thereof.

Still another object of the present invention is to provide improvements allowing an immediate and reliable detection of the liquid flowing through the known observation windows.

Another object of the invention is to possibly reduce the number of the valve components.

These and further objects are achieved with an improved valve for testing and draining sprinkler systems according to the present invention.

According to the present invention an improved valve for testing and draining sprinkler systems is provided which comprises:

a valve body consisting of a half-body with an inlet channel and a half-body with an outlet channel which define an open chamber housing a ball shutter, whereby the chamber is in a permanent fluid connection with the inlet channel;

a ball shutter rotatably housed within the housing chamber and provided with a through channel having two end openings with different diameters, that is a smaller opening for the test function and a bigger opening for the drain function on opposite flattenings, as well as a third flattening the axis of which is at right angle to the through channel and defines an inlet opening of a joining channel which opens out into the through channel;

a control lever controlling through a control stem the shutter in three presettable positions, that is in a closure position, a drainage position, and a test position, respectively;

as well as observation windows for the visual detection of the flowing flow; characterized in that i) the shutter is supported in the outlet channel by a known annular gasket and by a springing insert which is housed in the inlet half-body of the valve, is engaged, with a guiding action, onto the ball shutter, and exerts onto the shutter an elastic thrust substantially in axial direction, that is towards the outlet channel of the valve;

ii) the springing insert is provided with openings the edges of which cause turbulences in the flowing flow thus facilitating the visual detection of the flowing flow through the observation windows.

Further developments and advantageous embodiments of the invention are further inferable from the features set forth in the dependent claims.

BRIEF DESCRIPTION OF THE DRAWINGS

The features of this invention which are believed to be novel are set forth with particularity in the following description and in the appended claims. The invention, together with its object and the advantages thereof, may be best understood by reference to the following description provided by way of non-restrictive examples with reference to the accompanying drawings, which are schematic and made on convenience scales for clarity purposes, and in which:

FIG. 1 is a longitudinally sectional view through the middle vertical plane of a valve for testing and draining sprinkler systems known in the art;

FIG. 1A is an exploded vertical axial section trough the cage-like half-body of the valve of FIG. 1, however rotated around its longitudinal axis by 22.5° with respect to FIG. 1;

FIG. 2 is a perspective view of the ball shutter of the valve of FIG. 1;

FIGS. 3, 4 and 5 are top plan views of the valve of FIG. 1 with control lever in the off position, drain position, and test position, respectively;

FIGS. 3A, 4A and 5A are schematic details of horizontal sections showing the three shutter positions corresponding to the FIGS. 3, 4 and 5, respectively;

FIG. 6 is a detail showing the installation of a valve for sprinkler systems in a floor branch conduit delivering water to a sprinkler net of a building floor;

FIG. 7A is a vertical axial section through the inlet half-body according to the invention;

FIG. 21 is a detail in an horizontal section through the outlet channel of the valve of FIG. 7.

DETAILED DESCRIPTION OF THE PREFERRED EMBODIMENTS

Figure 7:
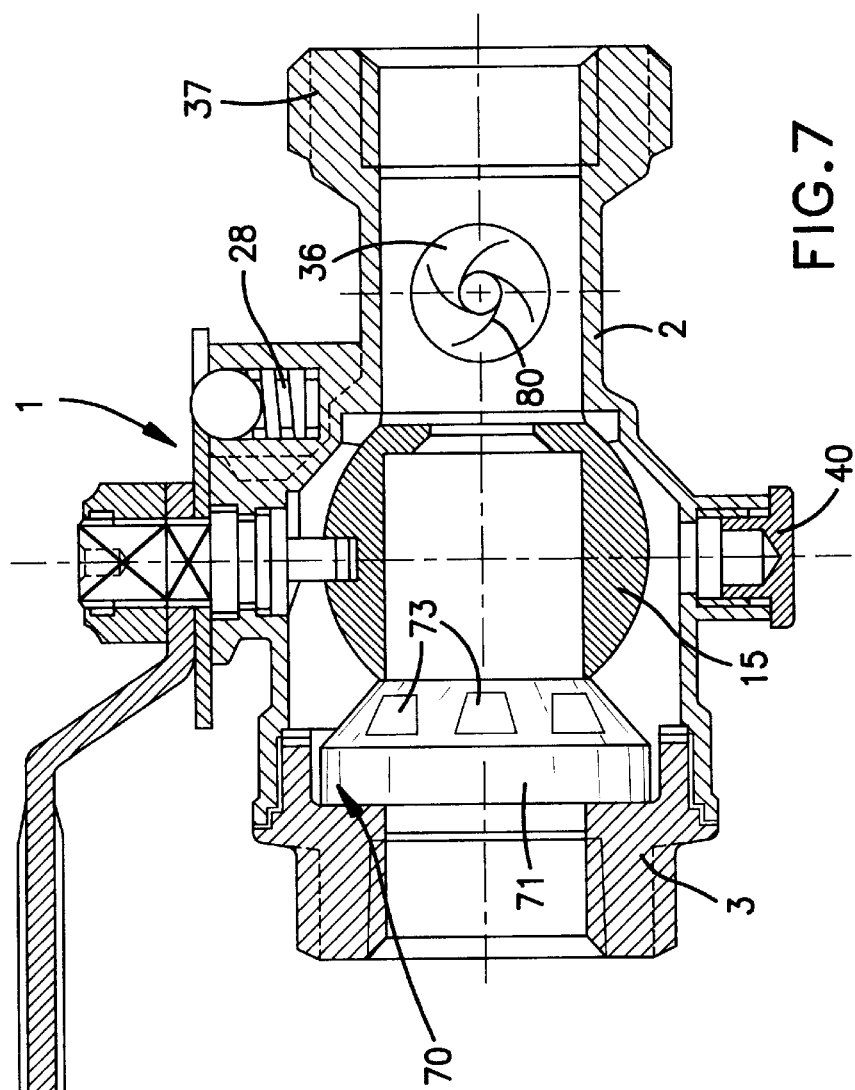
FIG. 7 is a vertical axial section through the middle longitudinal plane of an improved valve according to the present invention.
Figure 8:
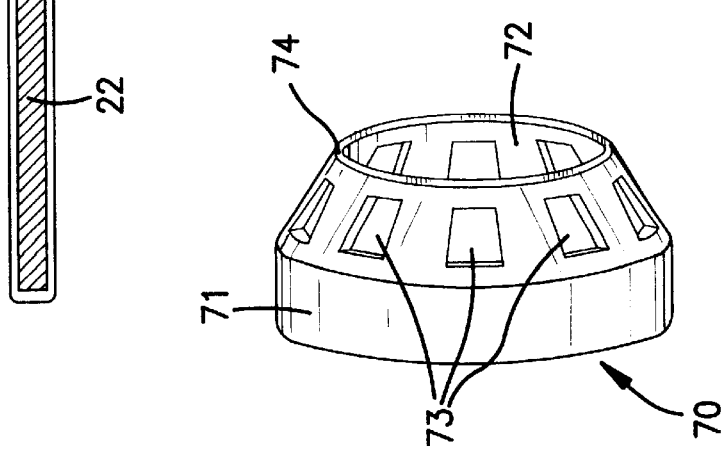
FIG. 8 is a perspective view of a first embodiment of the elastic insert according to the invention housed in the valve of FIG. 7.
Figure 9:
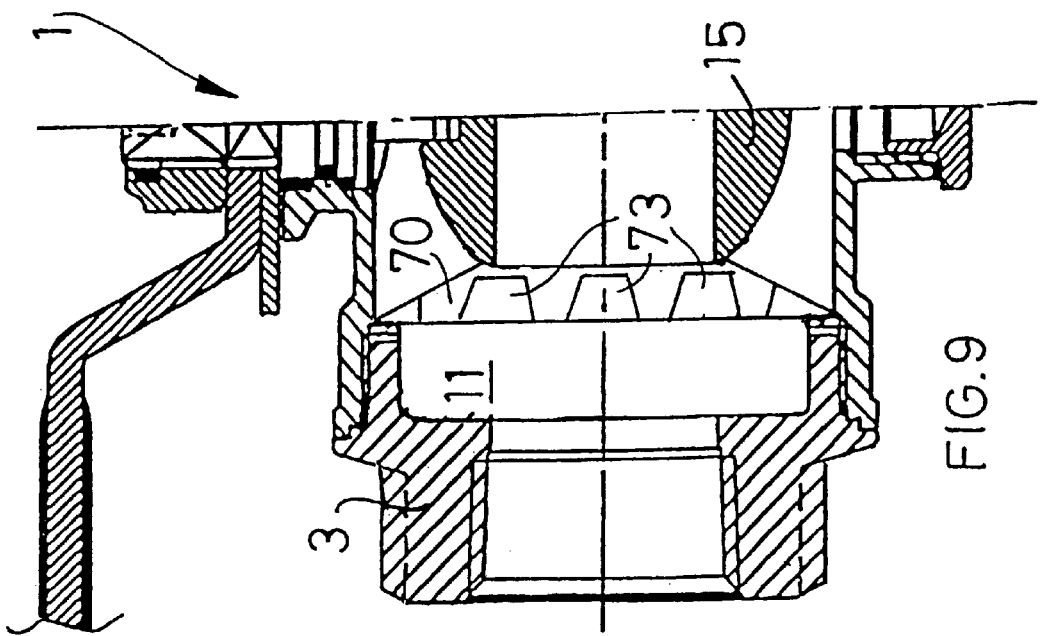
FIGS. 9 and 10 are a detail in a vertical axial section of the valve of FIG. 7 with a second embodiment of the elastic insert shown in FIG. 10, respectively.
Figure 10:
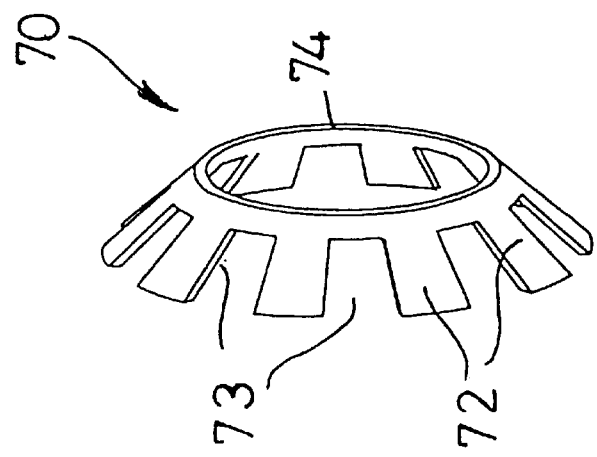
Figure 11:
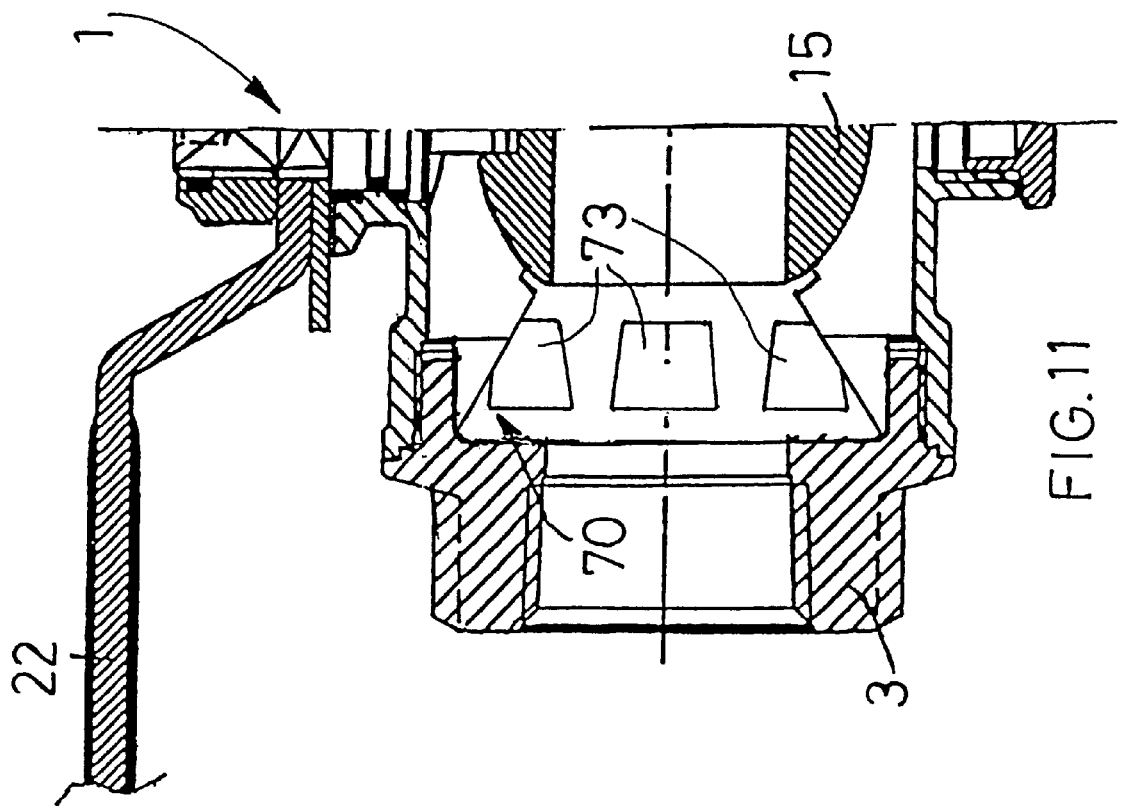
FIGS. 11 and 12 are a detail in a vertical axial section of the valve of FIG. 7 with a third embodiment of the elastic insert shown in FIG. 12, respectively.

Reference is first made to FIGS. 1 to 5 and 3A, 4A and 5A showing a prior art valve.

The valve for testing and draining sprinkler systems is generally denoted by 1. The valve comprises a valve body 2 consisting of two half-bodies 3 and 4 in which are provided an inlet channel 5 and an outlet channel 6. The half-body 3 represents a connecting part at the inlet side and, in the shown example, it is formed with an outer hexagon having an inner thread 9, and with a collar part 10, which has an outer thread and an inner diameter D which is bigger then the inner diameter d of said thread 9 in order to create in this way an inner annular chamber 11. In said chamber 11 are provided—in the shown example—four projecting ribs 12 which are diametrically opposed in planes at right angle to one another and in L-shaped seats 13 thereof house an annular gasket 14 supporting a ball shutter 15. The gasket 14 is housed in a metal reinforcing ring 17. Four openings of the chamber 11 are denoted by 18 and when the gasket 14 is mounted in the seats 13, said openings define a cage-like structure and are outwardly circumferentially open and longitudinally open out into a chamber 20 housing the shutter 15. After having screwed together the cage-like half-body 3 and the half-body 2, said chamber 20 forms an open chamber which is in fluid communication with the inlet channel 5. A second annular gasket denoted by 21 is housed within the half-body 2 and supports in conventional way the ball shutter 15. A control lever denoted by 22 is connected by a geometric engagement with the outer end of the control stem 23 the internal end of which is housed in the slot 24 of the shutter 15. Adjacently the neck 26 housing the central stem 23, the valve half-body 2 has a second neck 27 housing a spring 28 and a partially projecting ball 29. The ball 29 cooperates with one of three ports 31, 32, 33, respectively, which are provided on a common circle in a positioning plate 34 which is connected by geometric engagement with the profiled external end of said control stem 23 beneath the lever 22, and therefore rotates with the latter.

The assembly consisting of said positioning apertured plate 34, said ball 29 and the spring 28 represents the positioning means for setting the respective desired valve operation position, that is the respective desired position of the shutter 15.

In the outlet channel 6 are provided two opposed sight windows 36 which are formed, in the depicted embodiment, by two plugs composed of transparent material like glass and correspondent threaded seats thereof, which plugs are provided at the bottom thereof with an annular gasket 36A, FIG. 21. The outlet channel 6 terminates with an hexagonal end 37 having an inner thread 38 and forming the connection part at the outlet side.

A dump neck and a threaded plug are denoted by 39 and 40, respectively. The ball shutter 15 has a through channel 43 externally defined by two opposite and parallel flattenings 44 and 45, said through channel 43 has a longitudinal axis 46 and two different end openings, namely a bigger opening 47 for the drainage function and a small opening 48 for the test function. The shutter 15 has further a third flattening 49 defining the inlet opening 51 of a joining channel 52 which is coplanar with respect to the through channel 43 and has a longitudinal axis at right angle to the axis 46 of the through channel 43. A spherical closing portion of the shutter 15 interacting with the annular gasket 21 is denoted by 55, FIGS. 3A, 4A and 5A.

As shown in FIG. 6, the inlet 3 of the valve 1 is connected with a pipe 57 which is in turn connected with a floor branch conduit 59 by way of a T-fitting 58. By means of a further T-fitting 60 said branch conduit 59 is connected with a water supplying riser 61 of the building. By 62 is denoted a known water flow switch which is able to emit an electric signal when in the branch conduit 59 is flowing a water flow which conesponds at least to the flow of a sprinkler, not shown.

By 63 is denoted the inlet pipeline of the system or net provided with the sprinklers, non shown, whereas by 64 is denoted a draining conduit connected to the outlet 2 of the valve 1.

The three known operation conditions of such valve 1 are clearly inferable from FIGS. 3, 4 and 5 which substantially show the positions of the shutter 15 in the off position in FIG. 3, in the drain position in FIG. 4, and in the test position in FIG. 5. The flow path is indicated by arrows in FIGS. 3A, 4A and 5A.

In order to eliminate the above discussed disadvantages, the valve 1 is improved according to the present invention as follows.

First of all it is changed the conventional way of supporting the shutter between two opposite annular gaskets, requiring a strong compression action on the shutter, by suggesting a new shutter holding concept which adopts an axial pressure with elastic action onto the shutter 15 at the inlet side, that is at the fluid arrival side. Such an action, and at the same time the elimination of the annular gasket at the inlet side, is advantageously obtained while simplifying the construction of the inlet half-body 3, in the chamber 11 of which, now without the ribs 12, is housed an elastic insert 70, the function of which according to the present invention is that to exert an elastic thrust directly onto the shutter 15 substantially in the axial direction thereof.

As inferable from the FIGS. 7 to 20, the elastic insert 70 may present a configuration at will and may consist of the most suitable materials. In the embodiment of FIGS. 7 to 10 the insert 70 is obtained from a stainless steel plate and has, in FIG. 8, a, frustum cup-like and in FIG. 10 a frustum disc-like configuration. These inserts 70 may be easily produced by means of a known working by pressing-punching and do not require any additional working. The insert 70 of FIG. 8 has a first cylindrical part 71 followed by a conical segment 72 on which are obtained a plurality of openings 73, whereby the end having a smaller diameter is outwardly flanged down as shown in 74 in order to reduce the supporting friction of the shutter 15. The insert 70 of FIG. 10 can be considered a portion of the insert 70 of FIG. 8 as the insert 70 of FIG. 10 only has the perimetrical conical sector 72 with the openings 73 which are circumferencially open and the flange down 74 at the end with a smaller diameter. The openings 73 could also be made as perimetrically closed openings. As the insert 70 of FIG. 10 has a shorter axial extension, it requires a shorter configuration of the half-body 3 and, indirectly, of the valve 1, with the further advantage of having a lower weight.

Figure 12:
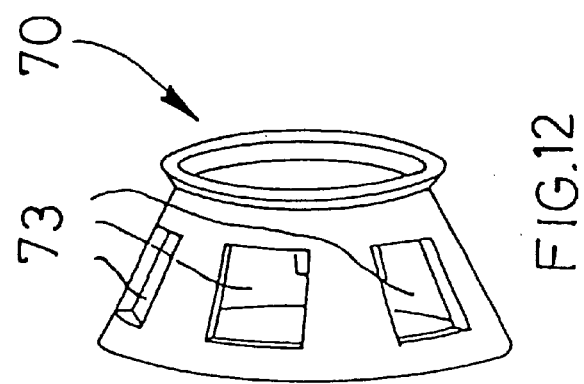
Figure 13:
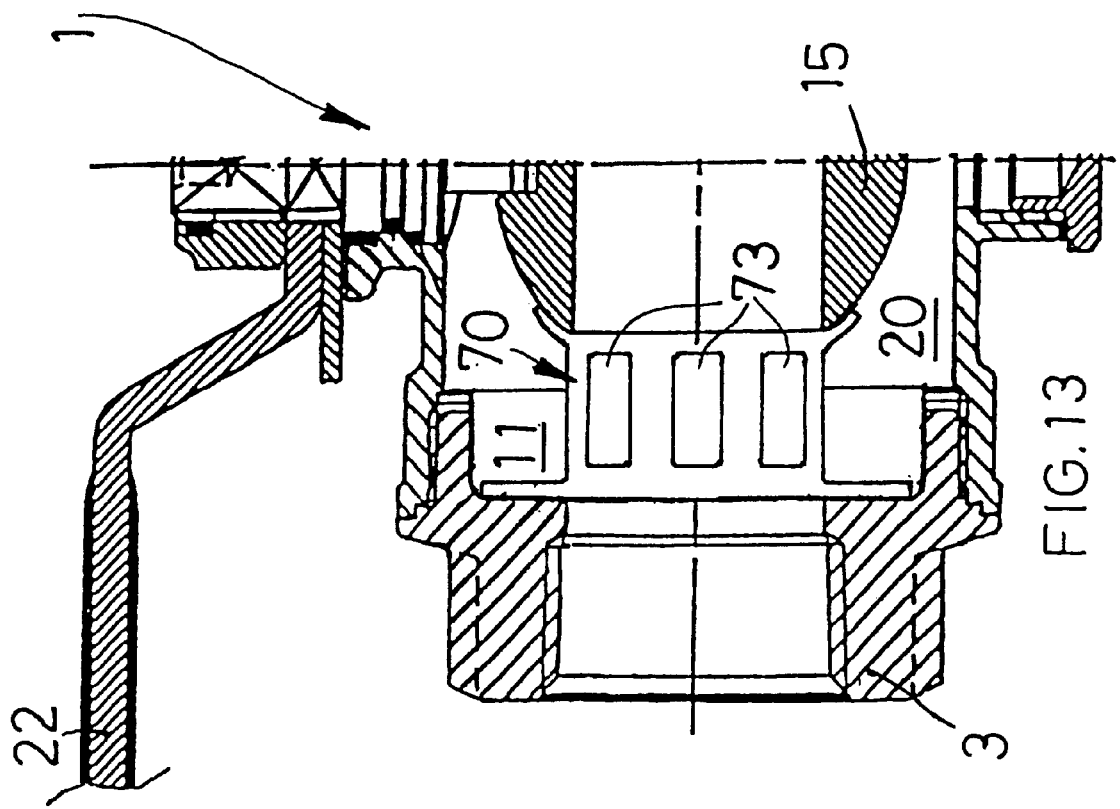
FIGS. 13 and 14 are a detail in a vertical axial section of the valve of FIG. 7 with a fourth embodiment of the elastic insert shown in FIG. 14, respectively.
Figure 14:
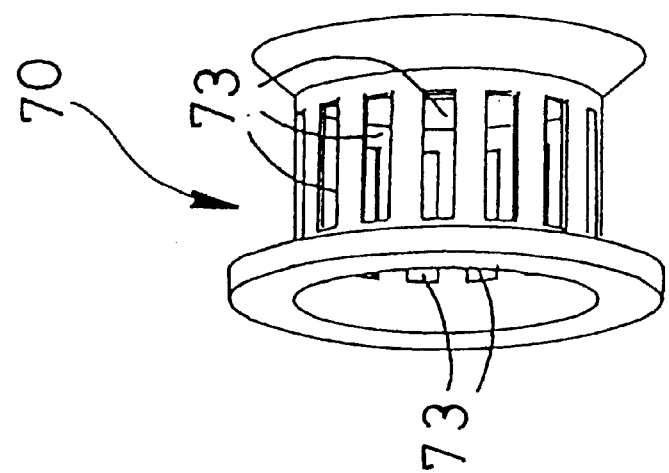
Figure 15:
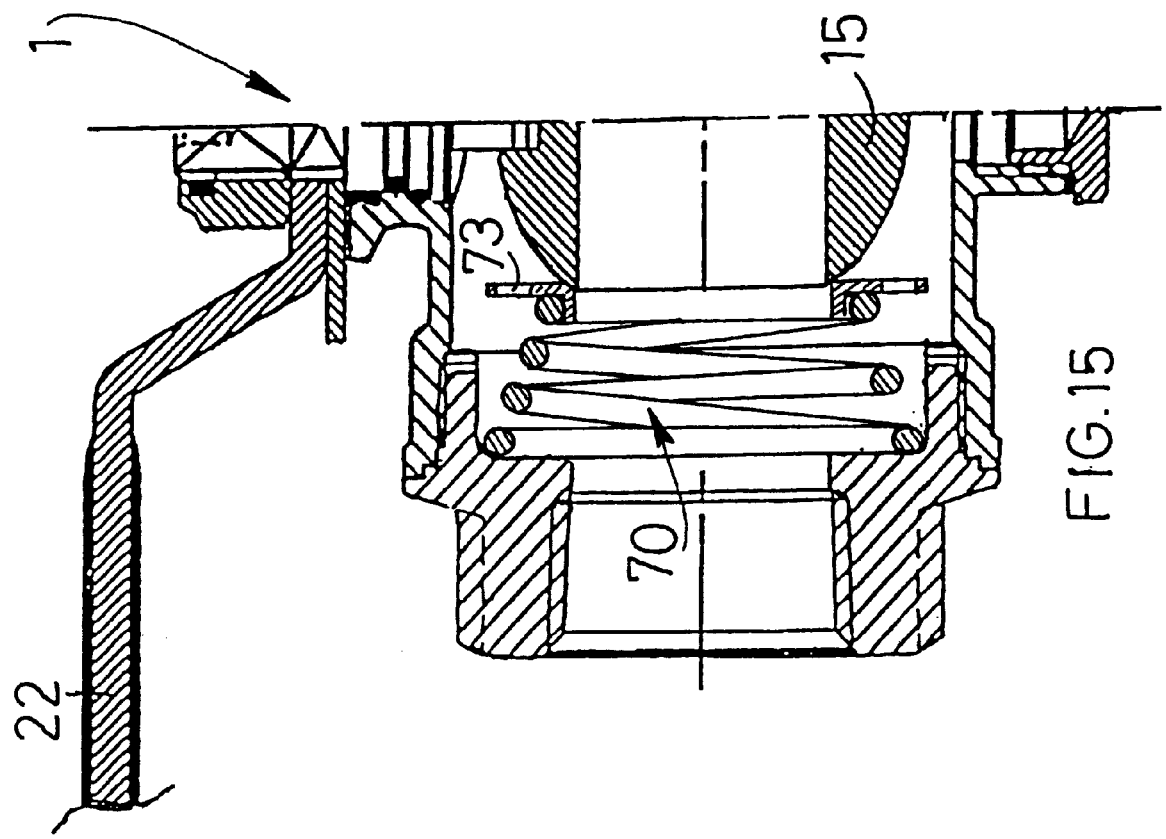
FIGS. 15 and 16 are a detail in a vertical axial section of the valve of FIG. 7 with a fifth embodiment of the elastic insert shown in FIG. 16, respectively.
Figure 16:
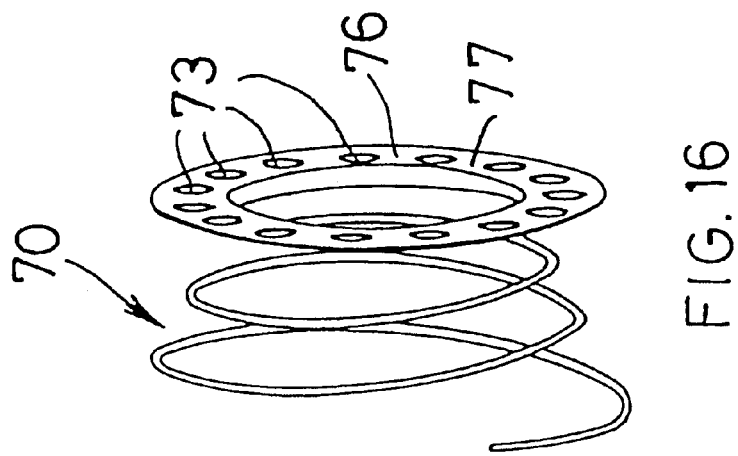
Figure 17:
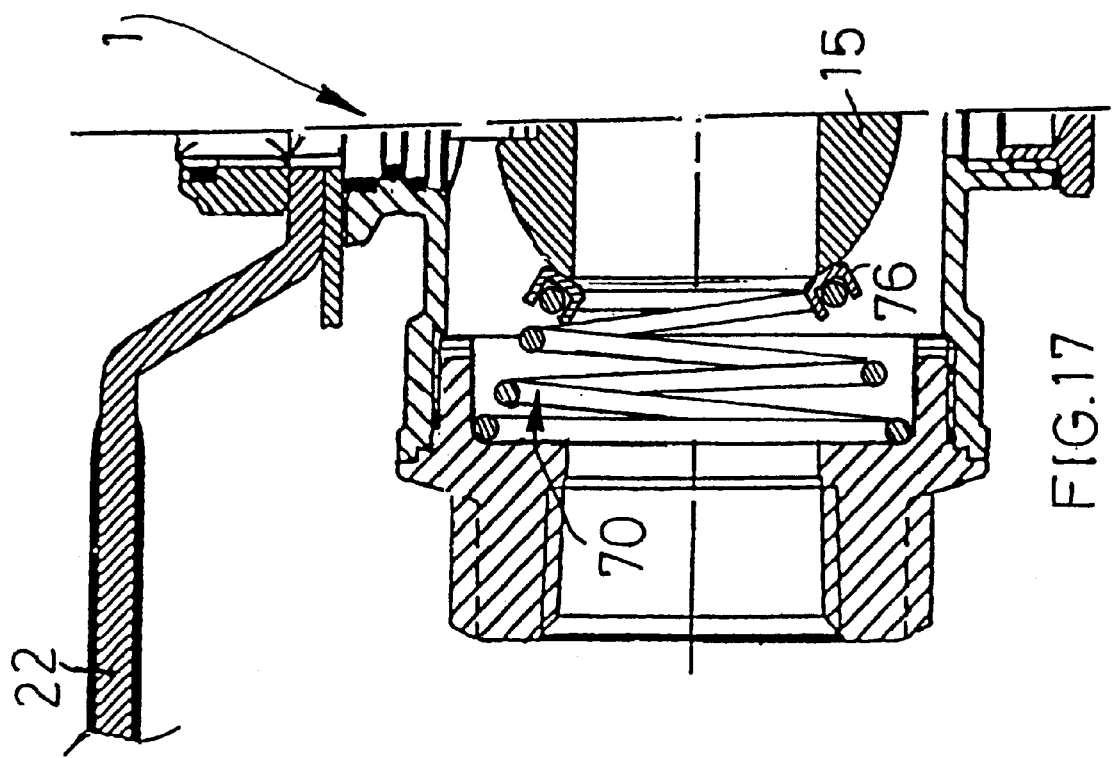
FIGS. 17 and 18 are a detail in a vertical axial section of the valve of FIG. 7 with a sixth embodiment of the elastic insert shown in FIG. 18, respectively.

The inserts 70 of the FIGS. 12 and 14 have a basket-like or reel-like configuration, respectively, with a truncated cone-like or cylindrical body. Both embodiments have the openings 73 mentioned above. The configuration of this inserts allows a production thereof with plastics by injection molding. The construction is particularly cheap and the intrinsic features of the plastic material allow a favorable friction reduction. The inserts 70 of FIGS. 16, 18 and 20 have substantially a spiral-like configuration, and more precisely in the embodiments of FIG. 16 and FIG. 18 with a frustum configuration, and in the embodiment of FIG. 20 with a cylindrical configuration. In order to guarantee a uniform circumferential engagement onto the ball shutter 15 the spirals 70 are provided with a bearing annular insert 76 for bearing onto the shutter 15. The insert in FIG. 16 has an annular configuration with a L-shaped cross-section on the radial side or flange 77 of which are obtained the openings 73 discussed hereinabove.

Figure 18:
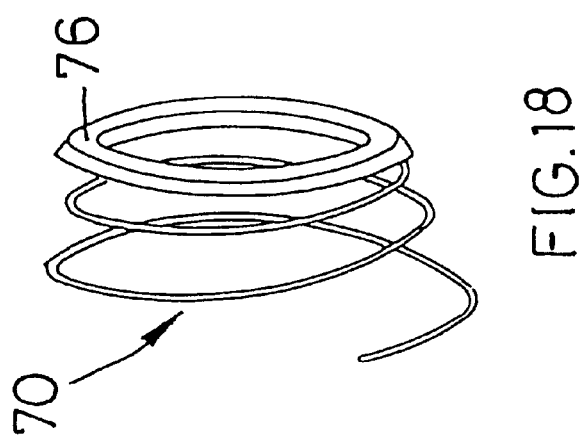
Figure 20:
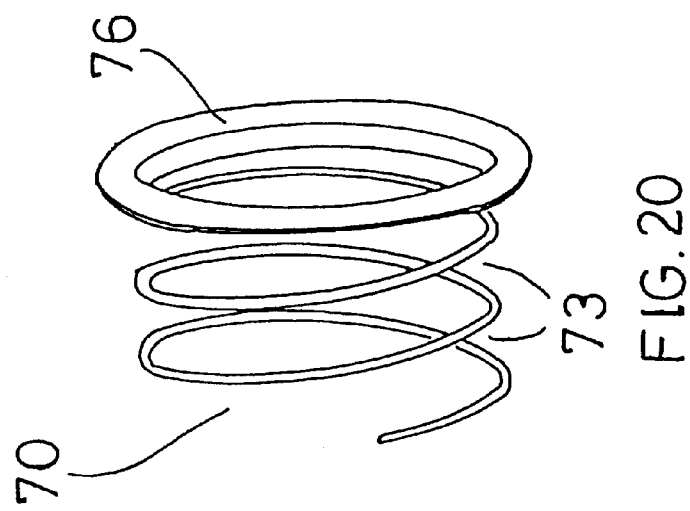

The inserts 70 of FIGS. 18 and 20 are instead provided with annular bearing inserts 76 with a U-shaped and a L-shaped cross-section, respectively. The spring inserts 70 are advantageously produced of stainless steel wire, for example an uncovered one, whereas the bearing inserts 76 are injection molded of plastics. They could also be omitted by utilizing a steel wire covered with plastics.

Figure 19:
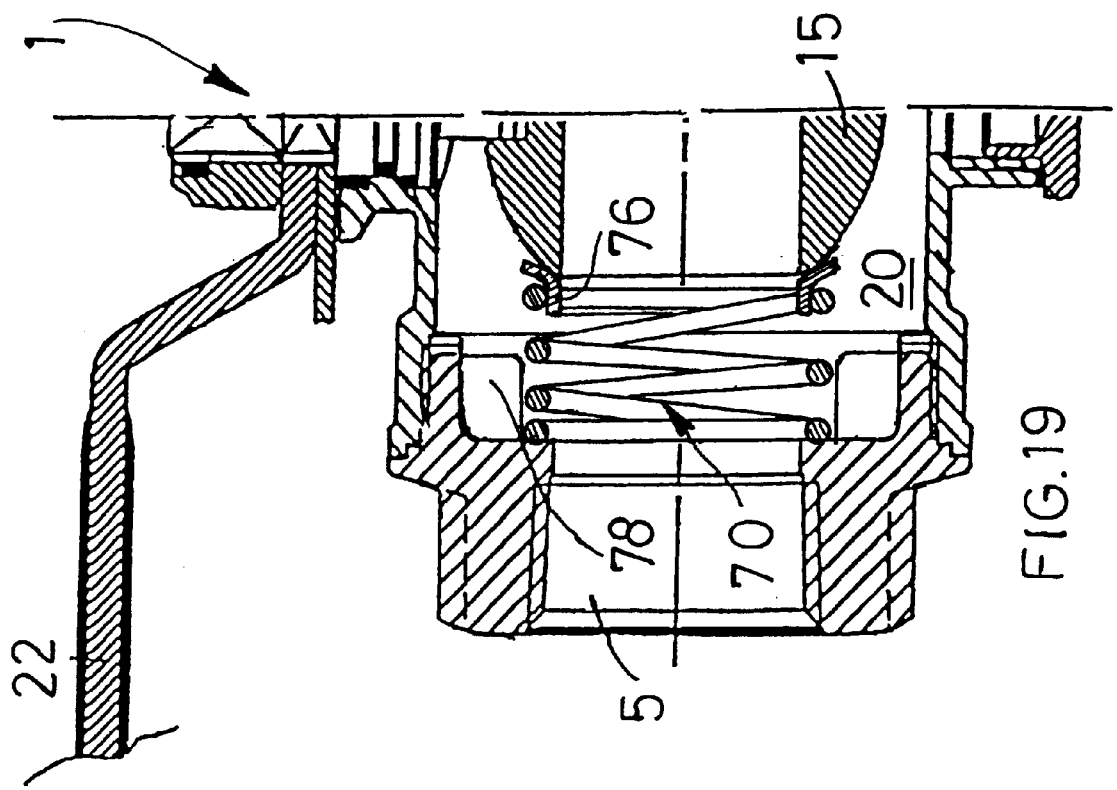
FIGS. 19 and 20 are a detail in a vertical axial section of the valve of FIG. 7 with a seventh embodiment of the elastic insert shown in FIG. 20, respectively.

In FIG. 19 by 78 are denoted ledges, for example four in the shown example, which are circumferentially distributed in order to obtain a correct positioning of the insert 70 consisting of a cylindrical spring 70. By using the suggested inserts 70 beside the action of an elastic thrust onto the shutter 15 is obtained at the same time an action causing a turbulence in the inlet flow. This takes place because the fluid is obliged to cross apertures, the delimitation edges of which cause turbulences in the flowing flow. Such openings 73 can be obtained with a configuration at will during the manufacturing of the inserts, that is by means of punching when the inserts consist of a metal plate, as well as directly in the injection step when the inserts are injection molded of plastics. In the case of spring inserts 70 the openings are defined by the coils themselves of the spring as well as by the edges or openings of the bearing inserts thereof 76.

The turbulences produced in the flow flowing through the valve 1 allow an easy visual detection of the flow through the observation windows 36. According to the present invention the visual detection of the flowing flow through the observation windows 36 may also be improved by supporting in the outlet channel 6 a paddle 80, the shaft 81 of which is idly supported in seats 82 provided in the bottom of the windows 36.

In fact, the flowing water causes a rotation of the paddle 80, which is unambiguously clearly visible through the windows 36. The configuration and the support of the paddle 80 may also be chosen in any other proper way. During the real operation the elastic action exerted by the inserts 70 onto the shutter 15 allows a considerable reduction of the control or opening movement or couple because the shutter 15 is no more strongly clamped between both opposed conventional annular gaskets supporting the shutter, whereby the insert 70 is only to mainly exert onto the shutter 15 a guiding and positioning action without exerting any sealing action, and this due to the use of an open chamber 20, that is a chamber which is always in fluid communication with the inlet channel 5. With the proposed improved valve the sealing action takes only place between the shutter 15 and the gasket 21 within the outlet channel 6.

Practically, the unambiguous detection of the flowing water through the observation windows 36 will be assured by the turbulences caused by the inserts 70 or, additionally or alternatively, by the rotation of the paddle 80. An increasing of the turbulences is further achievable, for example, by a more or less pronounced bending of the edges of the openings 73 as well as by varying the number of coils of the spring inserts 70.

A further advantageous aspect of the use of said springing inserts is to be seen in the fact of achieving a self-cleaning action by means of the insert 70 because possibly sandy matter which could be wedged between the annular gasket 21 and the shutter 15 instead of being captured between the shutter and the gasket and wearing the latter is easily favored in being removed due to the springiness of the shutter, that is to a possible slight axial movement thereof, and to a rotation of the shutter in opposite directions. In practice the configuration and the axial dimension of the chamber II in the half-body 3, as well as the configuration of the positioning projections 78 and the configuration of the respectively considered bearing inserts 76 may be chosen at will. The elastic inserts 70 themselves may present any configuration and consist of any material, also a composite one, as for example a steel wire covered by plastics, able to exert a springing thrust between the valve body and the shutter at the inlet side.

With the one-piece springing inserts 70 it is also advantageously possible to reduce the number of the valve components. In fact, the one-piece inserts practically substitute the inlet gasket 14 and the related reinforcing ring 17. With the springing inserts 70 it is further possible to simplify the manufacturing of the inlet half-body 3.

From the above structural and functional description of the improved valve according to the present invention it is inferable that with the suggested teaching it is possible to efficiently achieve the above stated objects and obtain the mentioned advantages.

In practice those skilled in the art may carry out functional equivalent modifications or alterations as for example to differently design the inlet half-body, or the chamber or housing positioning elements for the springing inserts, without departing from the scope of the present Invention.

What is claimed is:

1. In a valve for testing and draining sprinkler systems comprising:

a valve body consisting of an inlet half-body with an inlet channel and an outlet half-body with an outlet channel which define an open first chamber for housing a ball shutter, whereby said first chamber is in a permanent fluid communication with said inlet channel;

a ball shutter rotatably housed within said first chamber and provided with a through channel having two end openings with different diameters, namely a smaller opening for a test function and a bigger opening for a drain function on opposite first and second flattenings, and a third flattening having an axis which is at right angle to said through channel and defines an inlet opening of a joining channel which opens out into said through channel;

a control lever controlling, through a control stem, said shutter in three presettable positions, namely a closure position, a drainage position, and a test position, respectively; and observation windows for the visual detection of a flowing flow;

the improvement wherein:
  i) the shutter is supported at one side in the outlet channel by an annular gasket and at the other side by a springing insert which is housed in said inlet half-body of the valve; said springing insert being engaged, with a guiding action, onto said ball shutter, and exerting onto said shutter a substantially axial elastic thrust in a direction towards the outlet channel of the valve;
  ii) the springing insert is provided with openings having edges which cause turbulences in the flowing flow, thereby facilitating the visual detection of said flowing flow through the observation windows.

2. The valve according to claim 1, wherein said inlet half-body on its face adjacent to the first chamber housing said shutter is provided with a second chamber which is in fluid communication with said first chamber housing the shutter, whereby said second chamber houses said springing insert.

3. The valve according to claim 1, wherein said springing insert is produced as a punched piece obtained from a spring steel plate and presents a cup-like configuration with openings circumferentially spaced apart onto a frustum crown whose edge of said opening having the smaller diameter is inwardly flanged.

4. The valve according to claim 1, wherein said springing insert has a frustum plate-like configuration with circumferentially spaced apart openings which are either closed or open towards the exterior, and the edge of the opening having the smaller diameter is inwardly flanged.

5. The valve according to claim 1, wherein the springing insert has the configuration of a basket or a reel with circumferentially spaced apart openings onto a cylindrical body and lateral flanges, said springing insert comprising an injection molded body of plastic.

6. The valve according to claim 1, wherein the springing insert is a spiral spring consisting of an uncovered or plastic-covered steel wire having a frustum or cylindrical configuration, whereby when using an uncovered wire, said wire is provided with a bearing insert to be inserted between the springing insert and the ball shutter, whereby the bearing insert presents a U-shaped or L-shaped cross-section, and at least one vertical flange presents a plurality of circumferential openings.

7. The valve according to claim 6, further comprising projections located within the second chamber for axially positioning said spring insert into the inlet half-body.

8. The valve according to claim 1, wherein an idle paddle is supported within the outlet channel between opposite observation windows, said idle paddle having a shaft which is housed within seats provided at the bottom of said windows which are configured as a threaded plug consisting of a transparent material.

* * * * *